Patented Sept. 22, 1925.

1,554,371

UNITED STATES PATENT OFFICE.

CHARLES G. RICHARDSON, OF ELIZABETH, NEW JERSEY.

PROCESS OF OBTAINING ARSENIC ACID FROM METALLIC ARSENATES.

No Drawing.    Application filed October 20, 1921.   Serial No. 509,136.

*To all whom it may concern:*

Be it known that I, CHARLES G. RICHARDSON, a subject of the King of Great Britain, residing at Elizabeth, county of Union, and State of New Jersey, have invented certain new and useful Improvements in Processes of Obtaining Arsenic Acid from Metallic Arsenates, fully described in the following specification.

The present invention relates to a new method of recovering arsenic acid from a metallic or non-metallic arsenate, the arsenate being treated to produce a solution of arsenic acid and an insoluble anhydrous metallic sulphate, which can be separated from the arsenic solution by any known method, such as decantation, filtration, washing, etc.

The invention is applicable to the recovery of arsenic acid from either soluble or insoluble arsenate, the soluble arsenate being first converted into an insoluble arsenate, and the insoluble arsenate then converted into an insoluble anhydrous sulphate by the addition of the requisite amount of sulphuric acid as hereinafter described. It will be understood that the invention is designed for the reduction of such arsenates as form soluble sulphates when treated with sulphuric acid, and is not adapted for the treatment of such minerals as lead and calcium, or others which form insoluble sulphates when treated with sulphuric acid.

In the following description sodium arsenate will be used as an example of an alkali metal arsenate, and ferric arsenate will be used as an example of a heavier metal arsenate, though other arsenates might just as well have been used, as the process is applicable to other alkali metal and metallic arsenates.

In the treatment of speisses containing cobalt and nickel arsenides it has been known for some time that the said arsenides could be converted into arsenates. It has also been discovered that soluble arsenates could be obtained if the speisses were roasted with soda ash, or other sodium salts. Further, in the present methods of extracting cobalt, nickel and other metals from such speisses there is obtained a large amount of arsenate of iron.

The new process herein described takes metallic arsenates as produced by the above, or any other method, and by treatment in the manner hereinafter described recovers arsenic acid in a high degree of purity, at the same time recovering the metals as sulphates.

These may or may not have a value sufficient to repay further treatment, but it is one of the advantages of the process that in case further treatment is desired, said purification is rendered much easier by reason of the removal of the arsenic as arsenic acid previous to said purification.

In the case where an alkali metal arsenate such as sodium arsenate is to be dealt with, the salt is brought into solution with a suitable quantity of water, and ferric sulphate, which may be obtained as a product of the treatment hereafter described, is added to the sodium arsenate solution in sufficient quantity to precipitate the whole of the arsenic present, in the form of insoluble ferric arsenate, and leaving soluble sodium sulphate in solution.

The ferric arsenate is filtered off, and freed by washing from the sodium sulphate.

The ferric arsenate obtained as described, or in any other manner, is first suspended in water and then a sufficient quantity of sulphuric acid added to the mixture to react with the iron of the ferric arsenate to form ferric sulphate. The ferric arsenate dissolves in the strongly acid solution.

The solution of the ferric arsenate in sulphuric acid is then evaporated in a suitable pan or other evaporating apparatus.

As the solution loses its water a metathesis takes place, and an insoluble salt consisting of anhydrous ferric sulphate is formed which separates out wholly from the solution of arsenic acid.

This anhydrous ferric sulphate may then be parted from the liquid arsenic acid by decantation, or filtration, or both, leaving the arsenic acid in a commercially pure condition.

Inasmuch as anhydrous ferric sulphate is practically insoluble in cold water, except on long standing, the material may be readily washed free from arsenic acid. The wash water thus obtained either being evaporated a second time for the recovery of its arsenic acid, or used in preparing a new batch of ferric arsenate solution for treatment.

The solution of sodium sulphate obtained by the decomposition of the sodium arsenate may be evaporated and Glauber's salts recovered by crystallization.

It is obvious that in the treatment of sodium arsenate as described, the ferric sulphate so obtained may be used for treating a second batch of sodium arsenate, thus making the process cyclic.

Having thus set forth the nature of the invention what I claim herein is:

1. The process of making arsenic acid which comprises treating a soluble arsenate with a ferric sulphate to form an insoluble arsenate and then treating the said insoluble arsenate with sulphuric acid to form arsenic acid.

2. The process of making arsenic acid which comprises treating a solution containing a soluble alkali arsenate with a ferric sulphate to form a precipitate comprising an insoluble ferric arsenate, treating the insoluble arsenate with sulphuric acid, evaporating until an insoluble anhydrous sulphate forms as a precipitate and then decanting the arsenic acid.

3. The process of making arsenic acid which comprises dissolving a soluble alkali arsenate in water, precipitating the arsenic in the form of an insoluble ferric arsenate by means of ferric sulphate, separating the ferric arsenate and treating the same with sufficient sulphuric acid to form ferric sulphate, evaporating and then separating the anhydrous ferric sulphate and arsenic acid to obtain the latter.

4. The process of making arsenic acid which comprises dissolving sodium arsenate in water, adding ferric sulphate in sufficient quantity to precipitate the whole of the arsenic present in the form of insoluble ferric arsenate and leaving the soluble sodium sulphate in solution, filtering off the ferric arsenate and freeing the same from sodium sulphate by washing, suspending the ferric arsenate in water and then adding a sufficient quantity of sulphuric acid to react with the iron of the ferric arsenate to form ferric sulphate, evaporating until an anhydrous ferric sulphate forms and separates out and then separating the arsenic acid from anhydrous ferric sulphate by decantation.

5. The steps in the process of making arsenic acid which comprises treating an insoluble ferric arsenate with sulphuric acid, evaporating the resulting solution to such a point that the insoluble anhydrous ferric sulphate is formed and separates from the solution and finally separating the arsenic acid from the residue of insoluble sulphate by suitable means.

6. The steps in the process of making arsenic acid which comprises treating an insoluble ferric arsenate with sulphuric acid in quantities sufficient to react completely with the arsenate, evaporating the resulting solution until the sulphate formed becomes insoluble in the solution of arsenic acid and separates as anhydrous ferric sulphate, and mechanically separating the anhydrous ferric sulphate from the arsenic acid by suitable means.

7. The process for recovering arsenic acid from soluble metallic arsenates in which the soluble metallic arsenate is treated with ferric sulphate, the resulting ferric arsenate separated from the solution and then treated for recovery of arsenic acid and the re-formation of ferric sulphate, which after separation from the arsenic acid is used for the formation of further amounts of ferric arsenate by the treatment of further amounts of soluble sodium arsenate.

In testimony whereof I have hereunto set my hand.

CHARLES G. RICHARDSON.